(12) United States Patent
Ehara et al.

(10) Patent No.: US 11,922,523 B2
(45) Date of Patent: Mar. 5, 2024

(54) INFORMATION PROCESSING DEVICE, INFORMATION PROCESSING SYSTEM, AND PROGRAM FOR ACQUIRING POWER GENERATION INFORMATION AND GENERATING PROPOSAL INFORMATION INCLUDING A TYPE OF ELECTRIC POWER TO BE SELECTED

(71) Applicant: TOYOTA JIDOSHA KABUSHIKI KAISHA, Toyota (JP)

(72) Inventors: Masato Ehara, Gotemba (JP); Kazuhiro Shimizu, Sunto-gun (JP); Satoshi Tanabe, Mishima (JP); Nanae Takada, Susono (JP); Naohiro Seo, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 17/456,666

(22) Filed: Nov. 29, 2021

(65) Prior Publication Data

US 2022/0224112 A1 Jul. 14, 2022

(30) Foreign Application Priority Data

Jan. 14, 2021 (JP) .................... 2021-004371

(51) Int. Cl.
*G06Q 50/06* (2012.01)
*H02J 3/00* (2006.01)
*H02J 3/14* (2006.01)

(52) U.S. Cl.
CPC ............. *G06Q 50/06* (2013.01); *H02J 3/004* (2020.01); *H02J 3/0075* (2020.01); *H02J 3/14* (2013.01); *H02J 2300/20* (2020.01)

(58) Field of Classification Search
CPC .. G06Q 50/06; G06Q 10/103; G06Q 10/0639; H02J 3/004; H02J 3/0075; H02J 3/14; H02J 2300/20; H02J 15/008
See application file for complete search history.

(56) References Cited

U.S. PATENT DOCUMENTS 6,021,402 A * 2/2000 Takriti .................. G06Q 50/06
  700/32
6,512,966 B2 * 1/2003 Lof ........................ G06Q 40/04
  290/55

(Continued)

FOREIGN PATENT DOCUMENTS

JP 2020-003833 A 1/2020

*Primary Examiner* — M. N. Von Buhr
(74) *Attorney, Agent, or Firm* — Oblon, McClelland, Maier & Neustadt, L.L.P.

(57) ABSTRACT

An information processing device includes a processor configured to: acquire renewable power generation information from a renewable energy power generation server; acquire at least one of hydrogen power generation information from a hydrogen power generation server and fuel cell information; acquire grid power generation information from a grid power generation server; acquire electric power information from each of a plurality of consumer facilities in a predetermined area, the electric power information being regarding an amount of electric power consumed by the consumer facility; and generate proposal information including information on a type of electric power supplied to a predetermined consumer facility based on at least one of the renewable power generation information, the hydrogen power generation information, and the fuel cell information, the grid power generation information, and a plurality of pieces of the electric power information, and output the proposal information to the predetermined consumer facility.

14 Claims, 6 Drawing Sheets

(56) References Cited

U.S. PATENT DOCUMENTS

| | | | | |
|---|---|---|---|---|
| 7,444,189 B1* | 10/2008 | Marhoefer | .......... | H01M 8/0612 |
| | | | | 700/291 |
| 8,521,337 B1* | 8/2013 | Johnson | .................. | H02J 3/008 |
| | | | | 700/297 |
| 9,335,748 B2* | 5/2016 | Francino | .................... | H02J 3/00 |
| 10,374,433 B2* | 8/2019 | Ito | .............................. | H02J 7/35 |
| 10,439,429 B2* | 10/2019 | Ristau | ........................ | H02J 3/38 |
| 10,523,449 B2* | 12/2019 | Montalvo | ........... | H04L 12/2803 |
| 10,530,290 B2* | 1/2020 | Janik | ................. | G06Q 10/06312 |
| 11,258,301 B2* | 2/2022 | Sanders | ................... | H02J 3/322 |
| 2008/0319893 A1* | 12/2008 | Mashinsky | ............. | G05B 15/02 |
| | | | | 705/37 |
| 2014/0337002 A1* | 11/2014 | Manto | ............... | H02J 13/00004 |
| | | | | 703/18 |
| 2019/0013672 A1* | 1/2019 | McDaniel | .................. | G05F 1/66 |

* cited by examiner

INFORMATION PROCESSING DEVICE, INFORMATION PROCESSING SYSTEM, AND PROGRAM FOR ACQUIRING POWER GENERATION INFORMATION AND GENERATING PROPOSAL INFORMATION INCLUDING A TYPE OF ELECTRIC POWER TO BE SELECTED

CROSS-REFERENCE TO RELATED APPLICATION

This application claims priority to Japanese Patent Application No. 2021-004371 filed on Jan. 14, 2021, incorporated herein by reference in its entirety.

BACKGROUND

1. Technical Field

The present disclosure relates to an information processing device, an information processing system, and a program.

2. Description of Related Art

Japanese Unexamined Patent Application Publication No. 2020-3833 (JP 2020-3833 A) discloses a technique of using charts and graphs in electricity consumption notifications issued to consumers to clearly indicate items of surface-derived energy power generation (i.e., power generation from renewable energy sources), fossil fuel power generation, and nuclear power generation, and electricity charges, and to visually express the difference in charges of power generation due to the difference in technological factors.

SUMMARY

However, since a method of using both the power derived from renewable energy and the grid power has not been studied, the user cannot choose between the power derived from renewable energy and the grid power including fossil fuel-derived energy. Therefore, the user is forced to choose between two options, so the consumption of electric power derived from renewable energy cannot be increased, which may limit the spread of the use of renewable energy. This is also true when hydrogen-derived power can be used. Thus, there has been a demand for a technology capable of selecting the type of electric power with respect to the user's request and electric power for use in a predetermined area, and promoting the use of electric power derived from renewable energy or hydrogen.

The present disclosure has been made in view of the above, and an object thereof is to provide an information processing device, an information processing system, and a program capable of selecting the type of electric power with respect to the user's request and electric power for use in a predetermined area.

An information processing device according to the present disclosure includes a processor configured to: acquire renewable power generation information regarding power generation in a renewable energy-derived power generation facility from a renewable energy power generation server that outputs the renewable power generation information; acquire at least one of hydrogen power generation information regarding power generation in a hydrogen-derived power generation facility from a hydrogen power generation server that outputs the hydrogen power generation information and fuel cell information regarding power generation by a fuel cell using hydrogen fuel; acquire grid power generation information regarding power generation in a power generation facility that supplies grid power from a grid power generation server that outputs the grid power generation information; acquire electric power information from each of a plurality of consumer facilities in a predetermined area, the electric power information including information regarding an amount of electric power consumed by the consumer facility; and generate proposal information based on at least one of the renewable power generation information, the hydrogen power generation information, and the fuel cell information, the grid power generation information, and a plurality of pieces of the electric power information that have been acquired, and output the proposal information to a predetermined consumer facility, the proposal information including information on a type of electric power selected from power derived from renewable energy, power derived from hydrogen, power from the fuel cell, and the grid power that are supplied to the predetermined consumer facility.

An information processing system according to the present disclosure includes: a first device including a first processor configured to output renewable power generation information regarding power generation in a renewable energy-derived power generation facility; a second device including a second processor configured to output grid power generation information regarding power generation in power generation facility that supplies grid power; a third device including a third processor provided in each of a plurality of consumer facilities in a predetermined area and configured to output electric power information including information regarding an amount of electric power consumed by the consumer facility; at least one of a fourth device including a fourth processor configured to output hydrogen power generation information regarding power generation in a hydrogen-derived power generation facility, and a fifth device including a fifth processor configured to acquire and output fuel cell information regarding power generation by a fuel cell using hydrogen fuel; and a sixth device including a sixth processor that acquires the renewable power generation information from the first device, acquires the grid power generation information from the second device, acquires the electric power information from each of a plurality of the third devices, acquires at least one of the hydrogen power generation information from the fourth device and the fuel cell information from the fifth device, and generates proposal information based on the renewable power generation information, the grid power generation information, a plurality of pieces of the electric power information, and at least one of the hydrogen power generation information and the fuel cell information, and outputs the proposal information to a predetermined consumer facility, the proposal information including information on a type of electric power selected from power derived from renewable energy, the grid power, power derived from hydrogen, and power from the fuel cell that are supplied to the predetermined consumer facility.

A program according to the present disclosure causes a processor to execute: acquisition of renewable power generation information regarding power generation in a renewable energy-derived power generation facility from a renewable energy power generation server that outputs the renewable power generation information; acquisition of at least one of hydrogen power generation information regarding power generation in a hydrogen-derived power generation facility from a hydrogen power generation server that outputs the hydrogen power generation information and fuel cell information regarding power generation by a fuel cell using hydrogen fuel; acquisition of grid power generation information regarding power generation in a power generation facility that supplies grid power from a grid power generation server that outputs the grid power generation information; acquisition of electric power information from each of a plurality of consumer facilities in a predetermined area, the electric power information including information regarding an amount of electric power consumed by the consumer facility; and generation of proposal information based on at least one of the renewable power generation information, the hydrogen power generation information, and the fuel cell information, the grid power generation information, and a plurality of pieces of the electric power information that have been acquired, and output of the proposal information to a predetermined consumer facility, the proposal information including information on a type of electric power selected from power derived from renewable energy, power derived from hydrogen, power from the fuel cell, and the grid power that are supplied to the predetermined consumer facility.

According to the present disclosure, it is possible to select the type of electric power with respect to the user's request and the electric power used in a predetermined area.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described below with reference to the drawings. In all the drawings of the following embodiment, the same or corresponding portions are designated by the same reference signs. Further, the present disclosure is not limited to the embodiment described below.

In recent years, in a predetermined area called a smart city, power generation derived from renewable energy such as solar power generation capable of supplying electric power to various facilities, hydrogen power generation using hydrogen fuel, and the like have been studied. In the predetermined area, grid power obtained from thermal power generation, nuclear power generation, and the like is also provided by a power generation business operator, for example. However, it has been difficult for users to select, as desired, from the power generated by power generation derived from renewable energy (hereinafter, power derived from renewable energy), the power generated by hydrogen power generation (hereinafter, power derived from hydrogen), and the grid power. Thus, the present disclosure proposes a technology that enables the users to select the electric power for use from the power derived from renewable energy, the power derived from hydrogen energy, and the grid power.

For example, when users who care about natural energy can use the power derived from renewable energy and users who care about electricity charges at the time of use can use the cheapest electricity at the time of use, the convenience of the users is improved. In order to promote the use of the power derived from renewable energy or the power derived from hydrogen, the users may be given a reward or given a discount on the electricity charges if the users select the power derived from renewable energy or the power derived from hydrogen for use. When the users select the power derived from hydrogen, it is possible to give a reward in accordance with the amount of carbon dioxide reduced. Further, when the users select the power derived from hydrogen, the charge may be set based on the production cost of hydrogen fuel. The embodiment described below is based on the above ideas.

Figure 1:
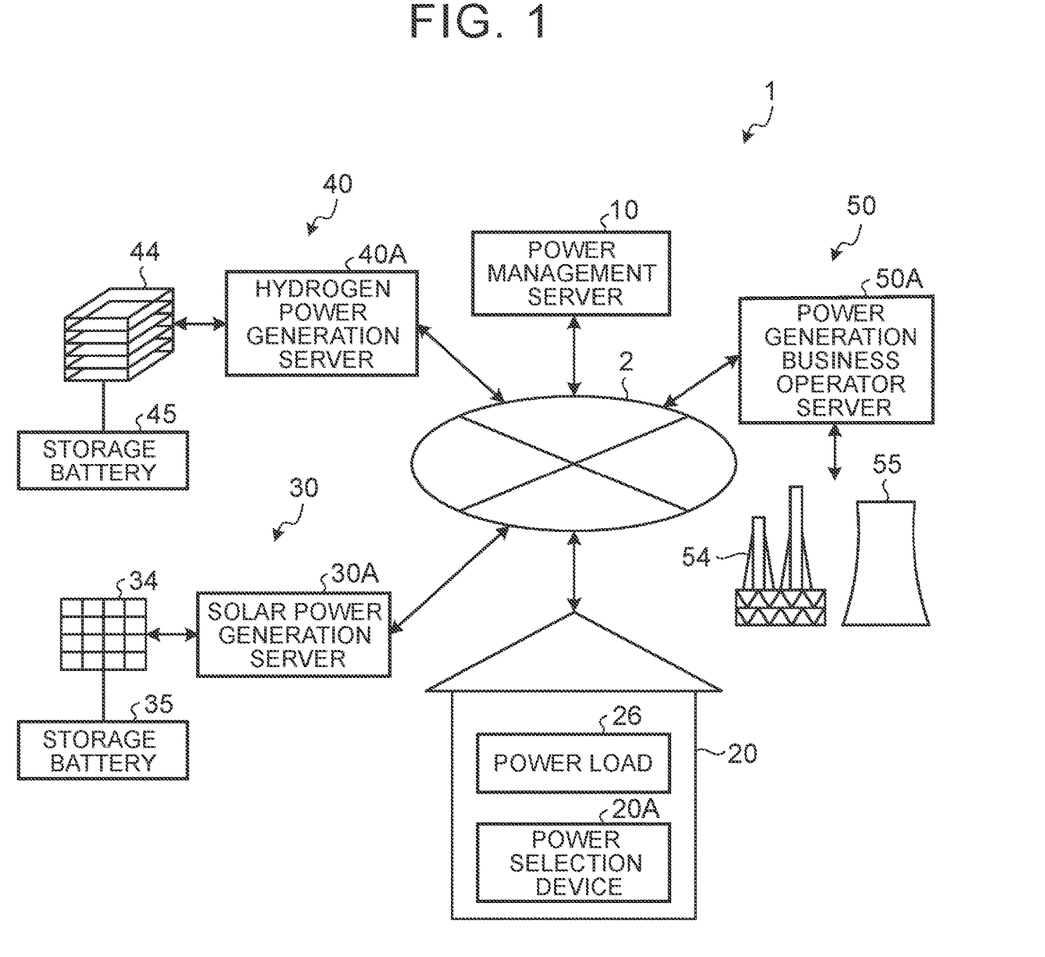
FIG. 1 is a schematic diagram showing a power management system according to an embodiment.

First, a power management system to which an information processing device according to the embodiment of the present disclosure can be applied will be described. FIG. 1 is a schematic diagram showing a power management system 1 according to the present embodiment. As shown in FIG. 1, the power management system 1 according to the present embodiment includes a power management server 10, a consumer facility 20, a solar power generation facility 30, a hydrogen power generation facility 40, and a business operator power generation facility 50 that can communicate with each other via a network 2. Each of the plurality of consumer facilities 20 includes a power selection device 20A serving as a third device. The solar power generation facility 30 includes a renewable energy power generation server and a solar power generation server 30A serving as a first device. The hydrogen power generation facility 40 includes a hydrogen power generation server 40A serving as a fourth device. The business operator power generation facility 50 includes a grid power generation server and a power generation business operator server 50A server as a second device. Further, each consumer facility 20 may be equipped with a hydrogen fuel cell capable of generating hydrogen. In this case, the hydrogen power generation facility 40 may or may not be provided. The pluralities of solar power generation facilities 30, hydrogen power generation facilities 40, and business operator power generation facilities 50 may be provided. In the following description, transmission and reception of information between the components are performed via respective communication units of the components and the network 2, but the description for each component will be omitted.

The network 2 is composed of, for example, the Internet network and a mobile phone network. The network 2 is, for example, a public communication network such as the Internet, and may include a telephone communication network such as a wide area network (WAN) and a mobile phone, and other communication networks such as a wireless communication network including WiFi (registered trademark).

Power Management Server

The power management server 10 can manage the electric power supplied to each consumer facility 20. In the present embodiment, various types of information such as electric power information is transmitted to the power management server 10 from each consumer facility 20 at a predetermined timing. The electric power information includes, but is not necessarily limited to, facility identification information, electric power measurement information, used electric power information, and the like. The electric power management server 10 can transmit and receive usage information, charge information, or reward information as selection information to and from the consumer facility 20. Various types of information such as power generation information is transmitted to the power management server 10 from the solar power generation facility 30, the hydrogen power generation facility 40, and the business operator power generation facility 50 at predetermined timings. The power generation information includes various types of information regarding power generation such as installation area, power generation business operator name, power plant code, power plant name, power generation type, unit name, authorized output (kW), and stop date for each of the power generation facilities 30, 40, 50.

Figure 2:
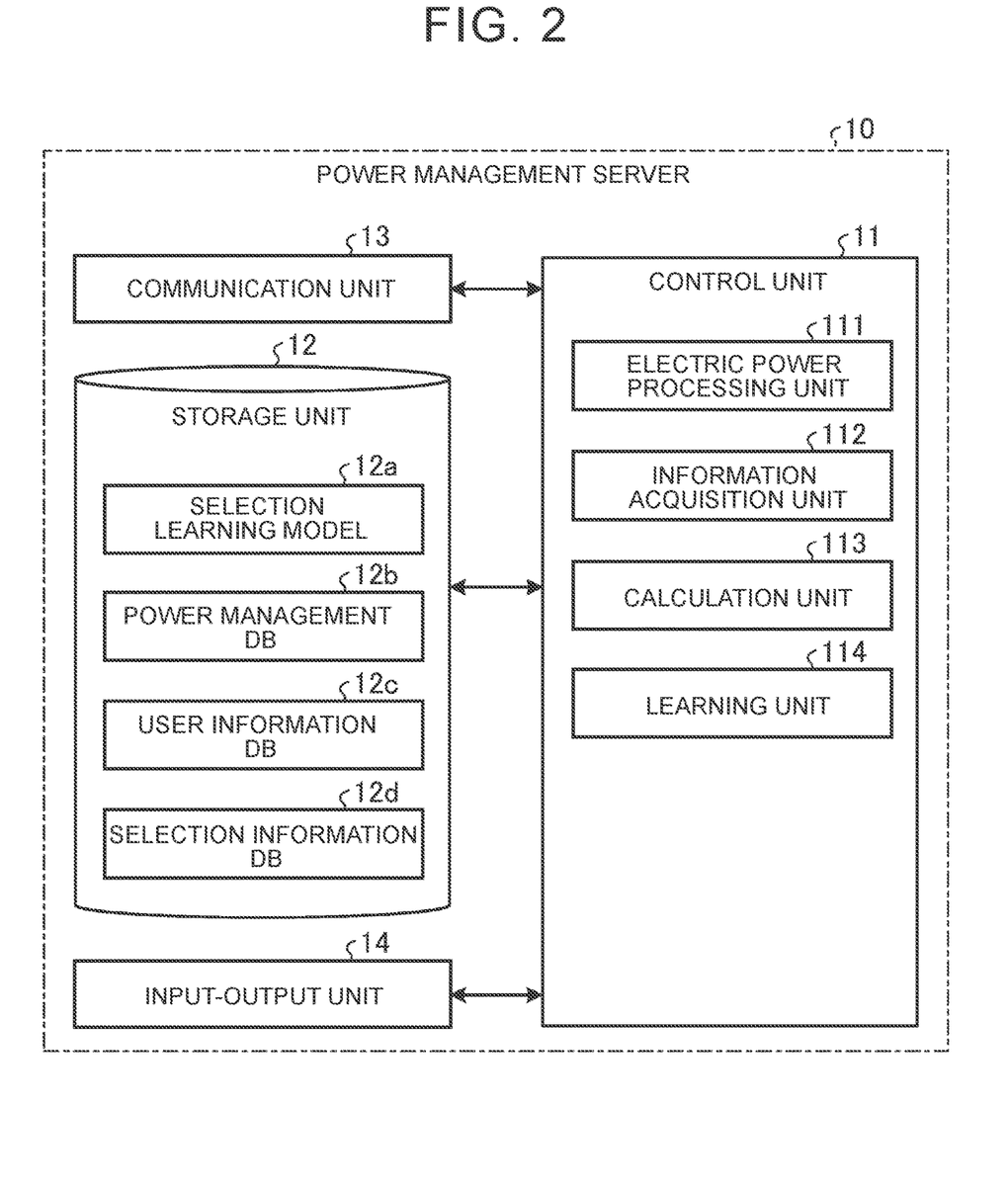
FIG. 2 is a block diagram schematically showing a configuration of a power management server according to the embodiment.

FIG. 2 is a block diagram schematically showing a configuration of the power management server 10. As shown in FIG. 2, the power management server 10 serving as a sixth device has a configuration of a general computer capable of communication via the network 2. The power management server 10 includes a control unit 11, a storage unit 12, a communication unit 13, and an input-output unit 14. The power management server 10 can manage the supply of electric power to the consumer facility 20.

Specifically, the control unit 11 serving as a sixth processor provided with hardware is composed of a processor such as a central processing unit (CPU), a digital signal processor (DSP), and a field-programmable gate array (FPGA), and a main storage unit such as a random access memory (RAM) and a read-only memory (ROM).

The storage unit 12 includes, for example, a recording medium selected from an erasable programmable ROM (EPROM), a hard disk drive (I-IDD), and a removable medium, etc. Examples of the removable medium include a disc recording medium such as a universal serial bus (USB) memory, a compact disc (CD), a digital versatile disc (DVD), and a Blu-ray (registered trademark) disc (BD). The storage unit 12 can store an operating system (OS), various programs, various tables, various databases, etc.

The control unit 11 loads the program stored in the storage unit 12 into the work area of the main storage unit and executes the program, and through the execution of the program, the control unit 11 can realize the functions of an electric power processing unit 111, an information acquisition unit 112, a calculation unit 113, and a learning unit 114. When a learning model serving as a program is used in the electric power processing unit 111, the learning model can be generated by the learning unit 114. The learning model can be generated through machine learning such as deep learning using a neural network, for example, with an input-output data set of predetermined input parameters and output parameters as teacher data. The same applies to the information acquisition unit 112 and the calculation unit 113. As a result, the control unit 11 can realize the functions of the electric power processing unit 111, the information acquisition unit 112, and the calculation unit 113 by the learning model. Further, the learning unit 114 may be a separate learning device.

The electric power processing unit 111 can derive the breakdown of the electric power supplied from the power generation facilities 30, 40, 50 that supply electric power to the respective consumer facilities 20, that is, the ratio of the grid power, the ratio of the power derived from renewable energy, and the power derived from hydrogen. Thereby, the electric power processing unit 111 can also select the electric power to be supplied to each consumer facility 20, from the grid power, the power derived from renewable energy, and the power derived from hydrogen.

The information acquisition unit 112 collects the electric power information from the power selection device 20A of each consumer facility 20, and collects the power generation information from the solar power generation server 30A, the hydrogen power generation server 40A, and the power generation business operator server 50A.

The calculation unit 113 can calculate the amount of electric power consumed in each consumer facility 20 and the electricity charge, and can calculate rewards such as points to be supplied to each consumer facility 20 and discount charges.

The learning unit 114 can learn the type of electric power selected by the user of the consumer facility 20. That is, the learning unit 114 can learn the type of electric power that the user of the consumer facility 20 selects from the power derived from renewable energy, the power derived from hydrogen, and the grid power, and the usage ratio thereof that the user of the consumer facility 20 sets. The learning unit 114 can learn the selection of electric power by the user of each consumer facility 20 and generate a selection learning model 12a corresponding to each consumer facility 20. The learning unit 114 can appropriately generate the selection learning model 12a by performing machine learning such as deep learning using a neural network for each consumer facility 20. The learning unit 114 can use the power generation information, the electric power information, and the user information as the learning input parameters, and the type of power selected by the user and the usage ratio thereof as the learning output parameters. The learning unit 114 can store the appropriately generated selection learning model 12a in the storage unit 12 and update the past selection learning model 12a. The electric power processing unit 111 can output the type of electric power and the usage ratio thereof by using the updated selection learning model 12a. The electric power processing unit 111 inputs the electric power information and the user information of the predetermined consumer facility 20 and the power generation information of the power generation facilities 30, 40, 50 into the selection learning model 12a as the input parameters. As a result, the selection learning model 12a can output the type of electric power preferred by the user of the consumer facility 20 and the usage ratio thereof as the output parameters.

A plurality of databases in which various types of data are stored in a searchable manner is stored in the storage unit 12. The storage unit 12 stores a power management database 12b, a user information database 12c, and a selection information database 12d. For the databases 12b to 12d, for example, a relational database (RDB) can be adopted. In the present embodiment, the database (DB) can be established when the program of the database management system (DBMS) executed by the processor manages the data stored in the storage unit 12.

In the power management database 12b, the facility identification information of each consumer facility 20 is associated with other information such as the electric power information and stored so as to be able to be updated, deleted, and searched. In the power management database 12b, the facility identification information of each of the power generation facilities 30, 40, 50 is associated with other information such as the power generation information and stored so as to be able to be updated, deleted, and searched. The facility identification information assigned to each consumer facility 20 is stored in the power management database 12b in a searchable state. The facility identification information includes various types of information for identifying the individual consumer facilities 20, and includes information necessary for accessing the power management server 10 when transmitting information related to the consumer facility 20. The facility identification information is also transmitted when the consumer facility 20 transmits various types of information. When the consumer facility 20 transmits predetermined information such as the electric power information and the user information together with the facility identification information to the power management server 10, the control unit 11 of the power management server 10 associates the predetermined information with the facility identification information and stores the predetermined information in the power management database 12b in a searchable state.

In the user information database 12c, the user information is stored, in association with the facility identification information of the consumer facility 20, so as to be able to be updated, deleted, and searched. The user information includes information regarding the preferences of the user who selects electric power by using the power selection device 20A of the consumer facility 20. In the selection information database 12d, the type of electric power selected in each consumer facility 20, reward information, and the like are stored so as to be able to be updated, deleted, and searched. The reward information includes point information set in accordance with the type of electric power and the amount of use of the electric power, coupon information, and discount information, and can be set in accordance with the type of electric power and the time of use of the electric power. The reward information is stored in the selection information database 12d in association with the facility identification information of the consumer facility 20 and the power generation facilities 30, 40, 50.

Similarly, the facility identification information assigned to each of the power generation facilities 30, 40, 50 is stored in the power management database 12b in a searchable state. The facility identification information includes various types of information for identifying the individual power generation facilities 30, 40, 50, and includes information necessary for accessing the power management server 10 when the information related to the power generation facilities 30, 40, 50 is transmitted. When the solar power generation facility 30, the hydrogen power generation facility 40, and the business operator power generation facility 50 respectively transmit various types of information such as the power generation information, the facility identification information is transmitted together therewith. When the power generation facilities 30, 40, 50 respectively transmit predetermined information such as the power generation information together with the facility identification information to the power management server 10, the control unit 11 associates the predetermined information with the facility identification information and stores the predetermined information in the power management database 12b in a searchable state.

The communication unit 13 is, for example, a local area network (LAN) interface board or a wireless communication circuit for wireless communication. The LAN interface board and the wireless communication circuit are connected to the network 2 such as the Internet, which is a public communication network. The communication unit 13 is connected to the network 2 and can communicate with the consumer facility 20, the solar power generation facility 30, the hydrogen power generation facility 40, and the business operator power generation facility 50. The communication unit 13 can receive, from each consumer facility 20, the facility identification information and the electric power information peculiar to the consumer facility 20, and transmit, to the consumer facility 20, an instruction signal and a confirmation signal of electric power used. The communication unit 13 can transmit and receive the power generation information to and from the solar power generation facility 30, the hydrogen power generation facility 40, and the business operator power generation facility 50.

The input-output unit 14 may be composed of, for example, a touch panel display, a speaker microphone, and the like. The input-output unit 14 serving as an output unit is configured to notify predetermined information to the outside according to the control by the control unit 11. The input-output unit 14 can display characters, figures, and the like on the screen of a display such as a liquid crystal display, an organic electroluminescent (EL) display, or a plasma display, and can output sound from a speaker. The input-output unit 14 includes a printer that outputs predetermined information by printing the information on printing paper or the like. Various types of information stored in the storage unit 12 can be confirmed, for example, on the display of the input-output unit 14 installed in a predetermined office or the like. The input-output unit 14 serving as an input unit is composed of, for example, a keyboard or a touch panel keyboard incorporated in the input-output unit 14 to detect a touch operation on the display panel, or a voice input device enabling the user to make a call to the outside.

Consumer Facility

Figure 3:
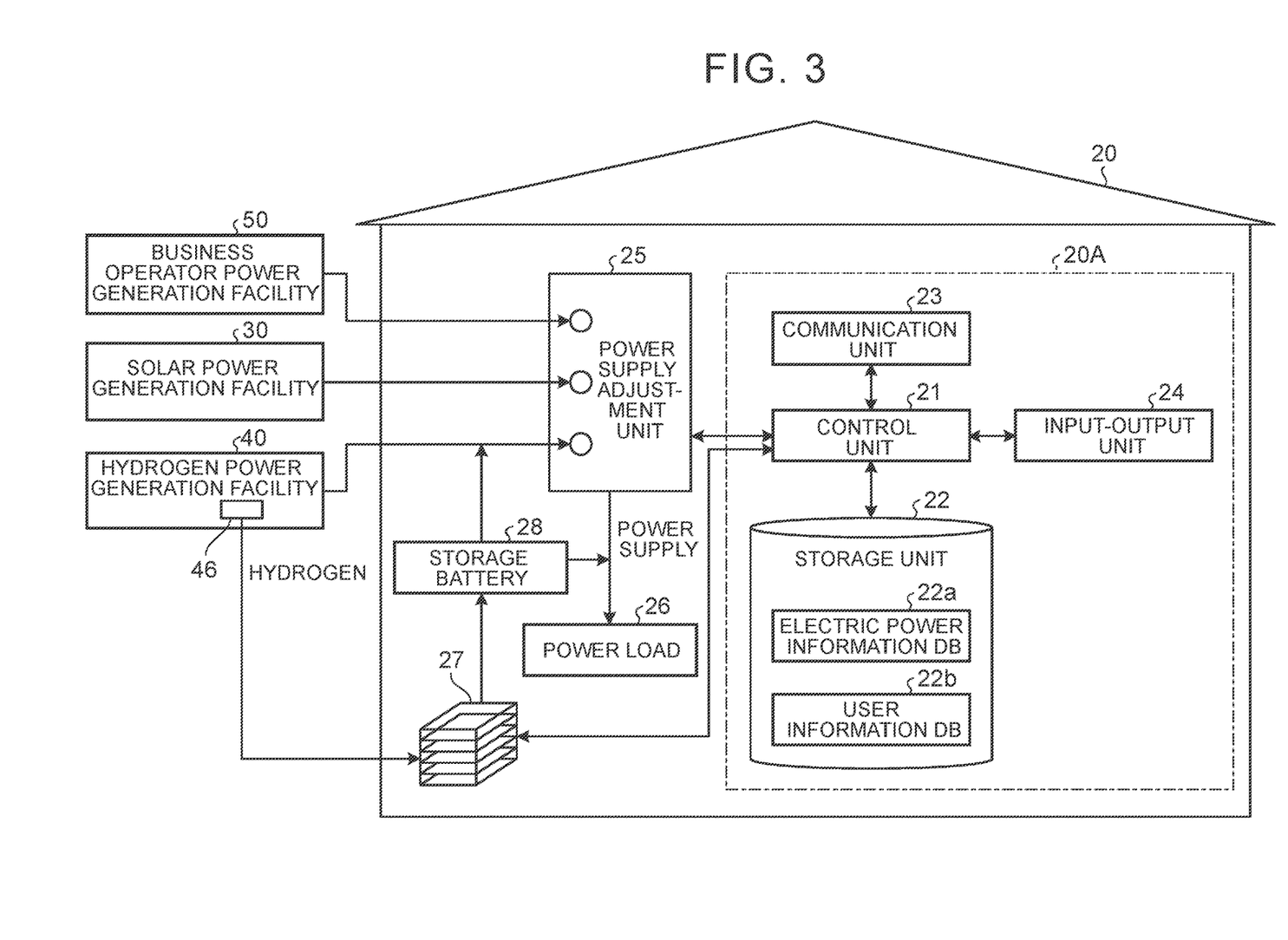
FIG. 3 is a block diagram schematically showing a configuration of a consumer facility according to the embodiment.

The consumer facility 20 that uses electric power includes various facilities such as a residential facility where people live, a working facility such as a company, and a commercial facility such as a store, as long as it is a facility that uses electric power.

FIG. 3 is a block diagram schematically showing a configuration of the consumer facility 20. As shown in FIG. 3, the consumer facility 20 includes a control unit 21, a storage unit 22, a communication unit 23, an input-output unit 24, a power supply adjustment unit 25, a power load 26, a fuel cell 27, and a storage battery 28. In the consumer facility 20, the power selection device 20A is composed of the control unit 21, the storage unit 22, the communication unit 23, and the input-output unit 24. The control unit 21, the storage unit 22, the communication unit 23, and the input-output unit 24 have the same physical and functional configurations as the control unit 11, the storage unit 12, the communication unit 13, and the input-output unit 14, respectively.

The control unit 21 serving as the third processor comprehensively controls the operation of various components provided in the consumer facility 20. The control unit 21 can realize the various control functions by reading the program stored in the storage unit 22. The power selection device 20A can control the power supply adjustment unit 25 and the fuel cell 27. The power selection device 20A serving as the fifth device is configured such that the control unit 21 serving as the fifth processor can acquire, from the fuel cell 27, fuel cell information regarding power generation of the fuel cell 27 using hydrogen fuel and output the fuel cell information.

The storage unit 22 can store an electric power information database 22a and a user information database 22b. Various types of information stored in the electric power information database 22a and the user information database 22b can be searched by the control unit 21.

In the electric power information database 22a, various types of data including information regarding supply and selection of electric power and provided from the power management server 10 are stored so as to be able to be added, updated, and deleted. In the electric power information database 22a, the electric power information including fuel cell information such as the charge amount of the storage battery 28, the remaining amount of hydrogen fuel of the fuel cell 27, and the amount of power generated by the fuel cell 27 can be stored so as to be able to be added, updated, and deleted. In the electric power information database 22a, electric power information including the usage amount of electric power derived from renewable energy supplied from the solar power generation facility 30 can be stored so as to be able to be added, updated, and deleted. In the electric power information database 22a, electric power information including the usage amount of electric power derived from hydrogen and the supply amount of hydrogen supplied from the hydrogen power generation facility 40 can be stored so as to be able to be added, updated, and deleted. In the electric power information database 22a, various types of information such as the usage amount of the grid power supplied from the business operator power generation facility 50 can be stored so as to be able to be added, updated, and deleted.

In the user information database 22b, information regarding the user who uses the power selection device 20A of the consumer facility 20 and the user information including information on the user's preferences are stored so as to be able to be added, updated, and deleted.

The communication unit 23 communicates with the power management server 10 by wireless communication via the network 2. The input-output unit 24 serving as an output unit is configured to be able to notify predetermined information such as electricity charges and the amount of use of electric power to the outside of the power selection device 20A. The input-output unit 24 serving as an input unit is configured such that the user or the like using the power selection device 20A can input predetermined information to the control unit 21.

With the control of the control unit 21, the power supply adjustment unit 25 can select the type of electric power for use from the electric power supplied from the solar power generation facility 30, the hydrogen power generation facility 40, the business operator power generation facility 50, and the fuel cell 27, and adjust the ratio of consumption of each type of electric power. That is, the power supply adjustment unit 25 is configured to be able to adjust the amount of electric power supplied from each of the solar power generation facility 30, the hydrogen power generation facility 40, the business operator power generation facility 50, and the fuel cell 27, with the control of the control unit 21. The power supply adjustment unit 25 may be provided outside the consumer facility 20. The power load 26 is a load in which electric power is used in the consumer facility 20.

The fuel cell 27 is configured to be able to store hydrogen supplied from a hydrogen tank 46 of the hydrogen power generation facility 40 or supplied from a business operator or the like that supplies hydrogen. As the fuel cell 27, for example, a polymer electrolyte fuel cell (PEFC) can be adopted that generates electricity by reacting stored hydrogen with oxygen in the air. As the fuel cell 27, a solid oxide fuel cell (SOFC), a phosphoric acid fuel cell (PAFC), a molten carbonate fuel cell (MCFC), or the like may be adopted. The storage battery 28 is configured to be able to store electric power generated by the fuel cell 27. The electricity stored in the storage battery 28 serving as the power derived from hydrogen can be combined with the power derived from hydrogen of the power supply adjustment unit 25 or can be supplied to the power load 26 of the consumer facility 20. The fuel cell 27 and the storage battery 28 can also be provided outside the consumer facility 20.

Solar Power Generation Facility

Figure 4:
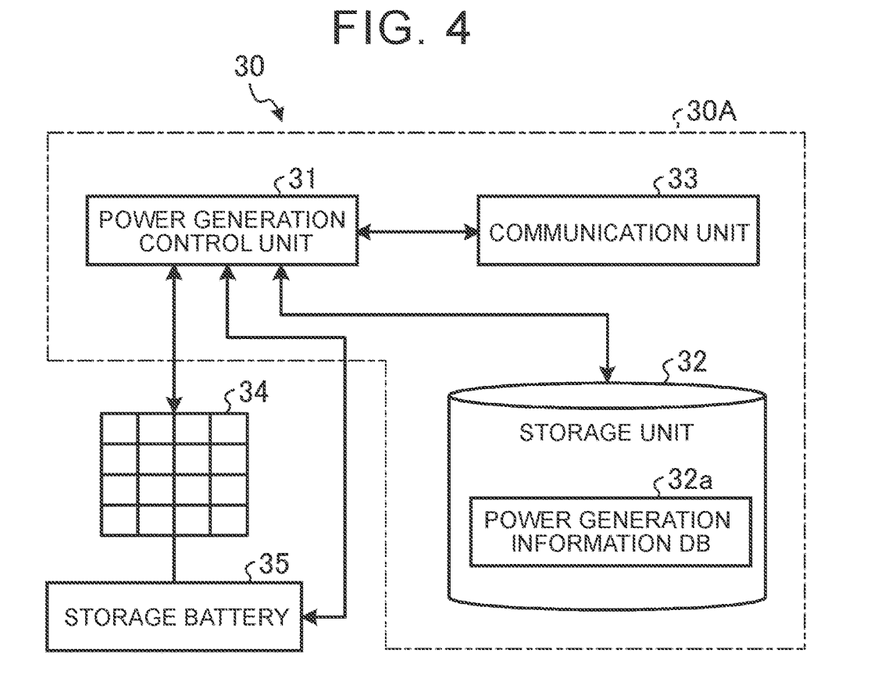
FIG. 4 is a block diagram schematically showing a configuration of a solar power generation facility according to the embodiment.

The solar power generation facility 30 is a facility capable of generating electric power to be supplied to each consumer facility 20 in a predetermined area such as a smart city by solar power. FIG. 4 is a block diagram schematically showing a configuration of the solar power generation facility 30. As shown in FIG. 4, a solar power generation server 30A provided in the solar power generation facility 30 has a configuration of a general computer capable of communication via the network 2, and includes a power generation control unit 31, a storage unit 32, and a communication unit 33. The power generation control unit 31 serving as a first processor, the storage unit 32, and the communication unit 33 have the same physical and functional configurations as the control unit 11, the storage unit 12, and the communication unit 13, respectively. A power generation information database 32a can be stored in the storage unit 32.

The solar power generation facility 30 includes a solar panel 34 and a storage battery 35 controlled by the solar power generation server 30A. The solar panel 34 is configured to include a plurality of solar cells that converts sunlight into electricity. The storage battery 35 is configured to be capable of storing the electric power generated by the solar panel 34. The solar panel 34 and the storage battery 35 are controlled by the power generation control unit 31 of the solar power generation server 30A. Various types of renewable power generation information related to solar power generation such as the power generation amount, power generation efficiency, operating rate, and charge amount and acquired by the power generation control unit 31 from the solar panel 34 and the storage battery 35 are stored in the power generation information database 32a as the power generation information.

Hydrogen Power Generation Facility

Figure 5:
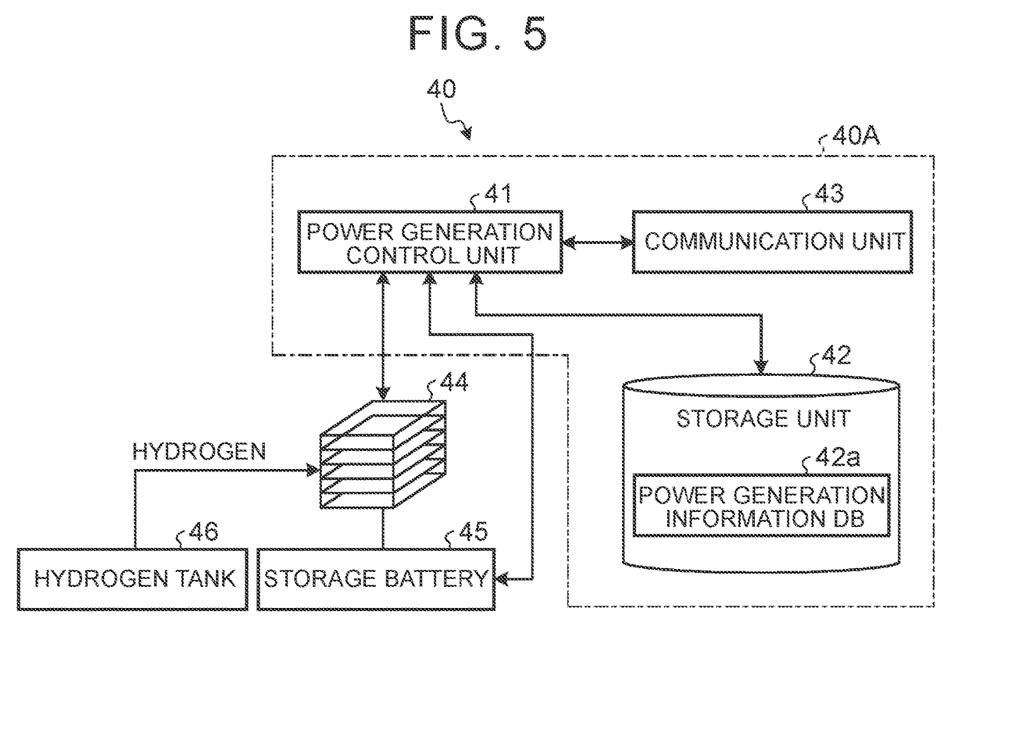
FIG. 5 is a block diagram schematically showing a configuration of a hydrogen power generation facility according to the embodiment.

The hydrogen power generation facility 40 is a facility capable of generating electric power to be supplied to each facility in the predetermined area such as a smart city by a fuel cell 44. FIG. 5 is a block diagram schematically showing a configuration of the hydrogen power generation facility 40. As shown in FIG. 5, a hydrogen power generation server 40A provided in the hydrogen power generation facility 40 has a configuration of a general computer capable of communication via the network 2, and includes a power generation control unit 41, a storage unit 42, and a communication unit 43. The power generation control unit 41 serving as a fourth processor, the storage unit 42, and the communication unit 43 have the same physical and functional configurations as the control unit 11, the storage unit 12, and the communication unit 13, respectively. A power generation information database 42a can be stored in the storage unit 42.

The hydrogen power generation facility 40 includes the fuel cell 44 and a storage battery 45 controlled by the hydrogen power generation server 40A. The hydrogen power generation facility 40 includes a hydrogen tank 46 capable of supplying hydrogen to the fuel cell 44. The hydrogen power generation facility 40 may supply hydrogen from the hydrogen tank 46 to each consumer facility 20. In this case, the hydrogen power generation facility 40 can be used as a hydrogen supply facility that supplies hydrogen from the hydrogen tank 46 to each consumer facility 20 without generating power. The fuel cell 44 generates electricity by reacting the stored hydrogen with oxygen in the air. As the fuel cell 44, for example, a molten carbonate fuel cell (MCFC) can be adopted, but a polymer electrolyte fuel cell (PEFC), a solid oxide fuel cell (SOFC), a phosphoric acid fuel cell (PAFC), or the like may be adopted. The storage battery 45 is configured to be capable of storing the electric power generated by the fuel cell 44. The electricity stored in the storage battery 45 can be supplied to each consumer facility 20 as the power derived from hydrogen. The fuel cell 44 and the storage battery 45 are controlled by the power generation control unit 41 of the hydrogen power generation server 40A. Various types of hydrogen power generation information related to hydrogen power generation such as the power generation amount, power generation efficiency, operating rate, and charge amount and acquired by the power generation control unit 41 from the fuel cell 44 and the storage battery 45 are stored in the power generation information database 42a as the power generation information.

Business Operator Power Generation Facility

Figure 6:
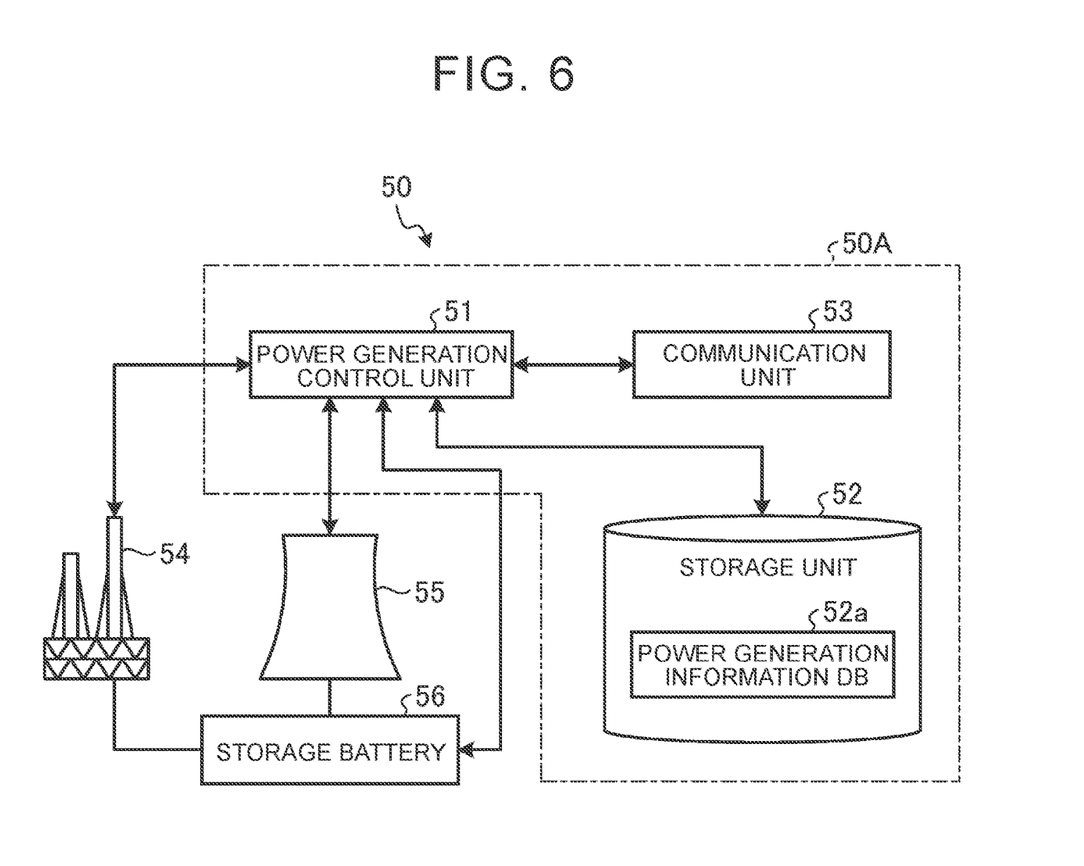
FIG. 6 is a block diagram schematically showing a configuration of a business operator power generation facility according to the embodiment.

The business operator power generation facility 50 is a facility capable of generating electric power to be supplied to each facility in the predetermined area such as a smart city by thermal power using fossil fuels such as petroleum and coal, geothermal power, and nuclear power. FIG. 6 is a block diagram schematically showing a configuration of the business operator power generation facility 50. As shown in FIG. 6, a power generation business operator server 50A provided in the business operator power generation facility 50 has a configuration of a general computer capable of communication via the network 2, and includes a power generation control unit 51, a storage unit 52, and a communication unit 53. The power generation control unit 51 serving as a second processor including hardware, the storage unit 52, and the communication unit 53 have the same physical and functional configurations as the control unit 11, the storage unit 12, and the communication unit 13, respectively. A power generation information database 52a can be stored in the storage unit 52.

The business operator power generation facility 50 includes the power generation business operator server 50A, power generation facilities such as a thermal power generation facility 54 and a nuclear power generation facility 55, and a storage battery 56. The thermal power generation facility 54 and the nuclear power generation facility 55 generate electricity by, for example, generating steam to rotate a turbine. The storage battery 56 is configured to be capable of storing electric power generated by the thermal power generation facility 54 and the nuclear power generation facility 55. The thermal power generation facility 54, the nuclear power generation facility 55, and the storage battery 56 are controlled by the power generation control unit 51 of the power generation business operator server 50A. Various types of grid power generation information related to power generation such as the power generation amount, power generation efficiency, operating rate, and charge amount and acquired by the power generation control unit 51 from the thermal power generation facility 54, the nuclear power generation facility 55, and the storage battery 56 are stored in the power generation information database 52a as power generation information.

Power Management Method

Figure 7:
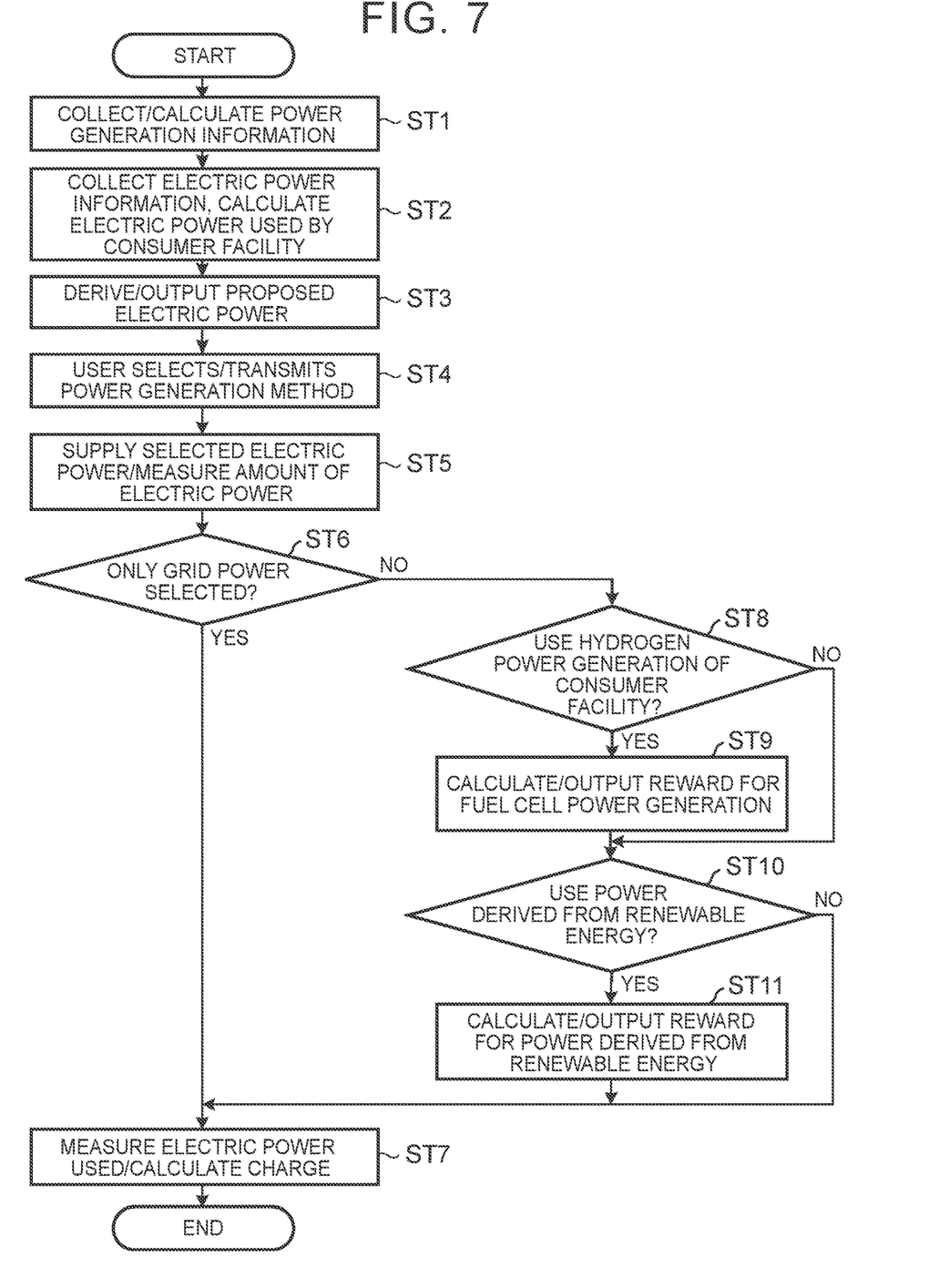
FIG. 7 is a flowchart illustrating a power management method according to the embodiment.

Next, a power management method according to the present embodiment will be described. FIG. 7 is a flowchart illustrating the power management method according to the present embodiment. In the following description, information is transmitted and received via the network 2. However, the description of transmission and reception via the network 2 will be omitted. Further, when information is transmitted and received between the power management server 10 and the consumer facility 20, the solar power generation facility 30, the hydrogen power generation facility 40, and the business operator power generation facility 50, identification information that identifies individual facilities is also transmitted and received together with the transmitted and received information. However, the description of transmission and reception of the identification information will be omitted. Further, the flowchart shown in FIG. 7 shows processes appropriately executed by the power management server 10 in the predetermined area.

As shown in FIG. 7, first, in step ST1, the information acquisition unit 112 of the control unit 11 of the power management server 10 collects power generation information periodically or as appropriate, from each of the solar power generation facility 30, the hydrogen power generation facility 40, and the business operator power generation facility 50. The information acquisition unit 112 stores the collected power generation information in the power management database 12b of the storage unit 12. The calculation unit 113 of the power management server 10 performs a predetermined calculation regarding the use of electric power in the predetermined area such as a smart city, based on the acquired power generation information. Here, the predetermined calculation refers to calculation to derive the amount of electric power generated by the hydrogen power generation facility 40, the amount of electric power purchased from the business operator power generation facility 50, and the like based on a predicted value of the amount of solar power generation by the solar power generation facility 30. The predicted value of the amount of solar power generation can be obtained by, for example, the following formula.

Predicted value of power generation amount (kWh)=Predicted value of solar radiation (kWh/m²)×Solar panel capacity (kW)×(1−Predicted value of loss)

(in the formula, the predicted value of loss is larger than 0 and less than 1).

In step ST2, the information acquisition unit 112 of the power management server 10 collects the electric power information periodically or as appropriate, from each consumer facility 20 in the predetermined area and stores the electric power information in the power management database 12b of the storage unit 12. The information acquisition unit 112 may acquire the user information from each consumer facility 20 periodically or as appropriate. The user information and the electric power information may be acquired at the same time or at different times. The calculation unit 113 of the power management server 10 calculates the electric power used by each consumer facility 20 based on the acquired electric power information. Further, in each consumer facility 20, the amount of use of electric power of the selected type, that is, the amount of use of each of the grid power, the power derived from renewable energy, and the power derived from hydrogen, is calculated. The calculated amount of use of electric power is stored in the power management database 12b in association with the facility identification information of the consumer facility 20.

Next, in step ST3, the electric power processing unit 111 inputs to the selection learning model 12a the power generation information of the power generation facilities 30, 40, 50, the electric power information of the consumer facilities 20 in the predetermined area, and the electric power information and the user information of the predetermined consumer facility 20 as input parameters. The selection learning model 12a selects the type of electric power to be proposed for use in the predetermined consumer facility 20 based on the input parameters that have been input, and derives and outputs the usage ratio of each proposed electric power. That is, the electric power processing unit 111 first selects necessary information from the amount of electric power supplied from each of the power generation facilities 30, 40, 50 within the predetermined area and the predicted value thereof and the amount of electric power used by the consumer facilities 20 within the predetermined area and the predicted value thereof. Then, the electric power processing unit 111 derives and outputs the type and usage ratio of the electric power proposed to the predetermined consumer facility 20 based on the selected information.

Specifically at least one type of electric power is selected, as the type of electric power for use, from the grid power, the power derived from renewable energy, and the power derived from hydrogen, and the usage ratios of these three types are derived and output. For example, the electric power processing unit 111 can derive the electric power for use in the predetermined consumer facility 20 as 50% grid power and 50% power derived from renewable energy, that is, power generated by solar power generation. Similarly, for example, the electric power processing unit 111 can derive as 30% power generated by solar power generation, 30% power from the hydrogen power generation facility 40, and 40% power from the fuel cell 27. The control unit 11 outputs information on the derived type of electric power and the usage ratio thereof as proposal information, stores the information in the selection information database 12d, and transmits the information to the consumer facility 20.

Here, the proposal information includes the type of electric power and the usage ratio thereof that substantially minimizes the power consumption in the predetermined area, the type of electric power and the usage ratio thereof that minimizes the electricity charge of the electric power used in the consumer facility 20, and the like. The proposal information may also include information such as only the power derived from renewable energy, only the power derived from hydrogen, or only the power generation by the fuel cell 27, based on the preferences included in the user information. In this case, the proposal information may further include information on the electricity charge per unit time.

Next, in step ST4, the power selection device 20A of the consumer facility 20 receives the proposal information of the type of electric power and the usage ratio thereof transmitted from the power management server 10 and stores the proposal information in the electric power information database 22a. The power selection device 20A outputs the acquired proposal information to the input-output unit 24 to notify the user. Thereby, the user of the consumer facility 20 can recognize the type of electric power and the usage ratio thereof that are proposed, in the consumer facility 20.

Subsequently, the user of the consumer facility 20 inputs information on the type of electric power for use and the usage ratio thereof through the input-output unit 24. The information on the type of electric power for use and the usage ratio thereof input by the user of the consumer facility 20 is stored in the electric power information database 22a as the electric power information, and is stored in the user information database 22b as user selection information. The control unit 21 transmits, to the power management server 10, the electric power information and the user selection information including the type of electric power and the usage ratio thereof that have been input. The information acquisition unit 112 stores the acquired electric power information in the power management database 12b of the storage unit 12 in association with the facility identification information of the user information database 12c. The information acquisition unit 112 stores the acquired user selection information in the selection information database 12d in association with the facility identification information of the user information database 12c of the storage unit 12. The learning unit 114 can update the selection learning model 12a for each consumer facility 20 based on the acquired user selection information.

Next, in step ST5, the control unit 21 controls the power supply adjustment unit 25 to supply electric power to the power load 26 based on the type of electric power for use and the usage ratio thereof input by the user. When electric power is supplied from the fuel cell 27 to the power supply adjustment unit 25, the control unit 21 indirectly controls the fuel cell 27. When the power derived from hydrogen is selected as the type of electric power for use, the control unit 21 may control the fuel cell 27 so as to directly supply electric power corresponding to the usage ratio to the power load 26.

In step ST6, the electric power processing unit 111 in the power management server 10 reads the user selection information from the selection information database 12d, and determines whether the type of electric power selected by the user in the consumer facility 20 is only the grid power. When the electric power processing unit 111 determines that the type of electric power selected by the user is only the grid power (step ST6: Yes), the process proceeds to step ST7.

In step ST7, the electric power processing unit 111 measures the usage amount of electric power (electric power usage amount) in the consumer facility 20. The calculation unit 113 calculates the electricity charge based on the electric power usage amount and stores the electricity charge in the power management database 12b. At the same time, the power generation control unit 51 of the power generation business operator server 50A in the business operator power generation facility 50 measures the electric power usage amount to be supplied to the consumer facility 20, calculates the electricity charge, and stores it in the storage unit 52.

In step ST6, when the electric power processing unit 111 determines that the type of electric power selected by the user is not only the grid power (step ST6: No), the process proceeds to step ST8. In step ST8, the electric power processing unit 111 determines whether the type of electric power selected by the user in the consumer facility 20 includes the power generated by the fuel cell 27, based on the user selection information read from the selection information database 12d. When the electric power processing unit 111 determines that the type of electric power selected by the user includes the power generated by the fuel cell 27 (step ST8: Yes), the process proceeds to step ST9.

In step ST9, the calculation unit 113 calculates the reward based on the amount of electric power generated by the fuel cell 27. Regarding the reward, reduction in electricity charges for the grid power and the power derived from renewable energy, reduction in charges for hydrogen fuel, and the like can be adopted as rewards for the consumer facility 20. Further, as the reward for the user of the consumer facility 20, issuance of coupons, provision of points, and the like can be adopted. Thereby, various rewards can be adopted for at least one of the consumer facility 20 and the user. The calculation unit 113 outputs reward information including information on the calculated reward and transmits the reward information to the consumer facility 20. The calculation unit 113 may transmit the reward information to a terminal owned by the user. Then, the process proceeds to step ST10.

On the other hand, when the electric power processing unit 111 determines in step ST8 that the type of electric power selected by the user does not include the power generated by the fuel cell 27 (step ST8: No), the process proceeds to step ST10.

In step ST10, the electric power processing unit 111 determines whether the type of electric power selected by the user in the consumer facility 20 includes the power derived from renewable energy, based on the user selection information read from the selection information database 12*d*. When the electric power processing unit 111 determines that the type of electric power selected by the user includes the power derived from renewable energy (step ST10: Yes), the process proceeds to step ST11.

In step ST11, the calculation unit 113 calculates the reward based on the amount of electric power derived from renewable energy. As the reward, various rewards such as reduction in electricity charges, issuance of coupons, and provision of points can be adopted. The calculation unit 113 outputs the calculated reward information and transmits the reward information to the consumer facility 20. Then, the process proceeds to step ST7.

On the other hand, when the electric power processing unit 111 determines in step ST10 that the type of electric power selected by the user does not include the power derived from renewable energy (step ST10: No), the process proceeds to step ST7. When a negative determination is made in all of steps ST6, ST8, and ST10 (steps ST6, ST8, ST10: No), the type of electric power selected is only the power from the hydrogen power generation facility 40, or the power from the hydrogen power generation facility 40 and the grid power.

In step ST7, the electric power processing unit 111 measures the electric power usage amount of the consumer facility 20 for each type of electric power. The calculation unit 113 calculates the charge based on hydrogen fuel for the power generated by the fuel cell 27, calculates the electricity charges for the grid power, the power derived from renewable energy, and the power derived from hydrogen, and stores the charges in the power management database 12*b*. At the same time, the power generation control units 31, 41, 51 of the respective servers 30A, 40A, 50A in the power generation facilities 30, 40, 50 each measure the electric power usage amount to be supplied to the consumer facility 20, calculate the electricity charge, and stores the electricity charge in the storage unit 32, 42, 52, respectively. Thus, the power management process according to the present embodiment is completed.

According to the embodiment of the present disclosure described above, the control unit 11 of the power management server 10 derives the amount of electric power supplied to the consumer facility 20 within the predetermined area from the power generation facilities 30, 40, 50 that can supply electric power to the predetermined area and the predicted value thereof, which are included in the power generation information. The control unit 11 also derives the amount of electric power used in the consumer facility 20 that is supplied with electric power within the predetermined area and the predicted value thereof, which are included in the electric power information. Then, the type of electric power and the usage ratio thereof are derived, based on the necessary information of the amount of the electric power supplied to the predetermined area and the predicted value thereof and the amount of electric power used in the consumer facility 20 and the predicted value thereof, and the electric power information and the user information of the predetermined consumer facility 20. In the predetermined consumer facility 20, the type of electric power and the usage ratio thereof proposed by the power management server 10 to the user and the type of electric power used in the consumer facility 20 and the usage ratio thereof can be determined from the user's own preferences and the like. Thereby, it is possible to select the desired type of electric power and the usage ratio thereof, with respect to the user's request and electric power used in the predetermined area, and thus it is possible to promote the use of the power derived from renewable energy or hydrogen.

Although the embodiment of the present disclosure has been specifically described above, the present disclosure is not limited to the above-described embodiment, and various modifications based on the technical idea of the present disclosure and embodiments combined with each other can be adopted. For example, the device configurations, display screens, and names given in the above-described embodiment are merely examples, and different device configurations, display screens, and names may be used as necessary.

The same functions as those of the power management server 10 may be implemented in the power selection device 20A of the consumer facility 20.

For example, in the embodiment, deep learning using a neural network is mentioned as an example of machine learning, but machine learning based on other methods may be performed. Other supervised learning such as support vector machines, decision trees, simple Bayes, and k-nearest neighbors may be used. Moreover, semi-supervised learning may be used instead of supervised learning. Furthermore, reinforcement learning or deep reinforcement learning may be used as machine learning.

Recording Medium

According to the embodiment, a program capable of executing a processing method by various servers 10, 30A, 40A, 50A, and the consumer facility 20 can be recorded in a recording medium that is readable by a computer and other machines or devices (hereinafter referred to as "computer or the like"). The computer or the like functions as the control units of the servers and the consumer facility as the computer or the like is caused to read the program stored in the recording medium and execute the program. Here, the recording medium that is readable by the computer or the like means a non-transitory storage medium that accumulates information such as data and programs through an electrical, magnetic, optical, mechanical, or chemical action and from which the computer or the like can read the information. Examples of the recording medium removable from the computer or the like among the recording media above include, for example, a flexible disk, a magneto-optical disk, a compact disc read-only memory (CD-ROM), a compact disc rewritable (CD-R/W), a digital versatile disc (DVD), a Blu-ray disc (BD), a digital audio tape (DAT), a magnetic tape, and a memory card such as a flash memory. In addition, examples of the recording medium fixed to the computer or the like include a hard disk and a ROM. Further, a solid state drive (SSD) can be used as the recording medium removable from the computer or the like or as the recording medium fixed to the computer or the like.

Other Embodiments

In the power management server 10, the power selection device 20A, the solar power generation server 30A, the hydrogen power generation server 40A, and the power generation business operator server 50A according to the embodiment, the term "unit" can be read as "circuit" or the like. For example, the communication unit can be read as a communication circuit.

The program to be executed by the power management server 10 or the consumer facility 20 according to the embodiment may be configured to be stored in a computer connected to a network such as the Internet and provided through downloading via the network.

In the description of the flowchart in the present specification, the order of the processing between steps is clarified using expressions such as "first", "then", and "subsequently". However, the order of processing required for realizing the embodiment is not always uniquely defined by those expressions. That is, the order of processing in the flowchart described in the present specification can be changed within a consistent range.

In addition, instead of a system equipped with one server, terminals capable of executing a part of the processing of the server may be distributed and arranged in a place physically close to the information processing device to apply edge computing technology that can efficiently communicate a large amount of data and shorten the arithmetic processing time.

Further effects and modifications can be easily derived by those skilled in the art. The broader aspects of the present disclosure are not limited to the particular details and representative embodiments shown and described above. Accordingly, various modifications may be made without departing from the spirit or scope of the general inventive concept as defined by the appended claims and their equivalents.

What is claimed is:

1. An information processing device comprising a processor configured to:
   acquire renewable power generation information regarding power generation in a renewable energy-derived power generation facility from a renewable energy power generation server that outputs the renewable power generation information;
   acquire at least one of hydrogen power generation information regarding power generation in a hydrogen-derived power generation facility from a hydrogen power generation server that outputs the hydrogen power generation information and fuel cell information regarding power generation by a fuel cell using hydrogen fuel;
   acquire grid power generation information regarding power generation in a power generation facility that supplies grid power from a grid power generation server that outputs the grid power generation information;
   acquire electric power information from each consumer facility of a plurality of consumer facilities in a predetermined area, the electric power information including information regarding an amount of electric power consumed by the each consumer facility of the plurality of consumer facilities;
   generate proposal information based on at least one of the renewable power generation information, the hydrogen power generation information, and the fuel cell information, the grid power generation information, and a plurality of pieces of the electric power information that have been acquired, and output the proposal information to a predetermined consumer facility, the proposal information including information on a type of electric power to be selected from power derived from renewable energy, power derived from hydrogen, power from the fuel cell, and the grid power that are supplied to the predetermined consumer facility, and information including a usage ratio of consumption of the power derived from renewable energy, the power derived from hydrogen, the power from the fuel cell, and the grid power;
   use a neural network to learn the type of electric power to be selected and the usage ratio;
   receive user selection information from a user of the predetermined consumer facility, the user selection information including the type of electric power selected by the user and the usage ratio based on the proposal information; and
   supply electric power to the predetermined consumer facility based on the received user selection information.

2. The information processing device according to claim 1, wherein the processor acquires user information regarding the user of the predetermined consumer facility, and generates the proposal information based on the electric power information and the user information of the predetermined consumer facility.

3. The information processing device according to claim 2, wherein when the type of electric power selected by the user includes the power derived from renewable energy, the processor calculates a reward to be provided to the predetermined consumer facility or the user and outputs the reward.

4. The information processing device according to claim 2, wherein:
   the fuel cell is configured to be able to supply electric power to the predetermined consumer facility; and
   the processor acquires, from the predetermined consumer facility, information on a type of electric power selected by the user of the predetermined consumer facility, and when the type of electric power selected by the user includes the power generated by the fuel cell, calculates a reward to be provided to the predetermined consumer facility or the user and outputs the reward.

5. The information processing device according to claim 2, wherein the user information includes information regarding a preference of the user of the predetermined consumer facility.

6. The information processing device according to claim 1, wherein the consumer facility includes a power supply adjustment unit configured to be able to select the type of electric power for use from the power derived from renewable energy, the power derived from hydrogen, the power from the fuel cell, and the grid power, and to be able to adjust the usage ratio.

7. An information processing system, comprising:
   a first device including a first processor configured to output renewable power generation information regarding power generation in a renewable energy-derived power generation facility;

a second device including a second processor configured to output grid power generation information regarding power generation in power generation facility that supplies grid power;

a third device including a third processor provided in each consumer facility of a plurality of consumer facilities in a predetermined area and configured to output electric power information including information regarding an amount of electric power consumed by the each consumer facility of the plurality of consumer facilities;

at least one of a fourth device including a fourth processor configured to output hydrogen power generation information regarding power generation in a hydrogen-derived power generation facility, and a fifth device including a fifth processor configured to acquire and output fuel cell information regarding power generation by a fuel cell using hydrogen fuel; and a sixth device including a sixth processor that acquires the renewable power generation information from the first device, acquires the grid power generation information from the second device, acquires the electric power information from each of a plurality of the third devices, acquires at least one of the hydrogen power generation information from the fourth device and the fuel cell information from the fifth device, and generates proposal information based on the renewable power generation information, the grid power generation information, a plurality of pieces of the electric power information, and at least one of the hydrogen power generation information and the fuel cell information, outputs the proposal information to a predetermined consumer facility, the proposal information including information on a type of electric power to be selected from power derived from renewable energy, the grid power, power derived from hydrogen, and power from the fuel cell that are supplied to the predetermined consumer facility, and information including a usage ratio of consumption of the power derived from renewable energy, the power derived from hydrogen, the power from the fuel cell, and the grid power, that uses a neural network to learn the type of electric power to be selected and the usage ratio, that receives user selection information from a user of the predetermined consumer facility, the user selection information including the type of electric power selected by the user and the usage ratio based on the proposal information, and that supplies electric power to the predetermined consumer facility based on the received user selection information.

8. The information processing system according to claim 7, wherein the sixth processor acquires user information regarding the user of the predetermined consumer facility, and generates the proposal information based on the electric power information and the user information of the predetermined consumer facility.

9. The information processing system according to claim 8, wherein the user information includes information regarding a preference of the user of the predetermined consumer facility.

10. The information processing system according to claim 8, wherein when the information of the type of electric power selected by the user includes the power derived from renewable energy, the sixth processor calculates a reward to be provided to the predetermined consumer facility or the user and outputs the reward.

11. The information processing system according to claim 8, wherein:

the fuel cell is configured to be able to supply electric power to the predetermined consumer facility; and the sixth processor acquires, from the predetermined consumer facility, information on a type of electric power selected by the user of the predetermined consumer facility, and when the type of electric power selected by the user includes the power generated by the fuel cell, calculates a reward to be provided to the predetermined consumer facility or the user and outputs the reward.

12. The information processing system according to claim 11, wherein the third device and the fifth device are provided in the consumer facilities.

13. The information processing system according to claim 7, wherein the consumer facility includes a power supply adjustment unit configured to be able to select the type of electric power for use from the power derived from renewable energy, the power derived from hydrogen, the power from the fuel cell, and the grid power, and to be able to adjust the usage ratio.

14. A non-transitory computer readable medium having stored thereon instructions that causes a processor to execute:

acquiring renewable power generation information regarding power generation in a renewable energy-derived power generation facility from a renewable energy power generation server that outputs the renewable power generation information;

acquiring at least one of hydrogen power generation information regarding power generation in a hydrogen-derived power generation facility from a hydrogen power generation server that outputs the hydrogen power generation information and fuel cell information regarding power generation by a fuel cell using hydrogen fuel;

acquiring grid power generation information regarding power generation in a power generation facility that supplies grid power from a grid power generation server that outputs the grid power generation information;

acquiring electric power information from each consumer facility of a plurality of consumer facilities in a predetermined area, the electric power information including information regarding an amount of electric power consumed by the each consumer facility of the plurality of consumer facilities;

generating proposal information based on at least one of the renewable power generation information, the hydrogen power generation information, and the fuel cell information, the grid power generation information, and a plurality of pieces of the electric power information that have been acquired, and outputting the proposal information to a predetermined consumer facility, the proposal information including information on a type of electric power to be selected from power derived from renewable energy, power derived from hydrogen, power from the fuel cell, and the grid power that are supplied to the predetermined consumer facility, and information including a usage ratio of consumption of the power derived from renewable energy, the power derived from hydrogen, the power from the fuel cell, and the grid power;

using a neural network to learn the type of electric power to be selected and the usage ratio;

receiving user selection information from a user of the predetermined consumer facility, the user selection information including the type of electric power selected by the user and the usage ratio based on the proposal information; and supplying electric power to the predetermined consumer facility based on the received user selection information.

* * * * *